(12) United States Patent
Brain et al.

(10) Patent No.: US 11,662,716 B2
(45) Date of Patent: May 30, 2023

(54) SECURE REMOTE COLLABORATION FOR EQUIPMENT IN A MANUFACTURING FACILITY

(71) Applicant: KLA Corporation, Milpitas, CA (US)

(72) Inventors: Michael Brain, Los Gatos, CA (US); Ramon Olavarria, Fremont, CA (US); Joseph Gutierrez, Santa Clara, CA (US); Ravi Bhagat, Milpitas, CA (US); Assaf Kantorovich, Morgan Hill, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/375,374

(22) Filed: Jul. 14, 2021

(65) Prior Publication Data
US 2022/0276639 A1    Sep. 1, 2022

Related U.S. Application Data (60) Provisional application No. 63/153,970, filed on Feb. 26, 2021.

(51) Int. Cl.
*G05B 19/418*    (2006.01)
(52) U.S. Cl.
CPC ..... *G05B 19/4185* (2013.01); *G05B 19/4183* (2013.01)
(58) Field of Classification Search
CPC .......................... G05B 19/4185; G05B 19/4183
See application file for complete search history.

(56) References Cited

U.S. PATENT DOCUMENTS 8,229,587 B2    7/2012    Shieh et al.
8,510,476 B2    8/2013    Eastvold
(Continued)

FOREIGN PATENT DOCUMENTS

KR    101185796 B1    10/2012
KR    20180079130 A    7/2018
WO    2016137397 A3    10/2016

OTHER PUBLICATIONS

"ASML: Driving the future of microchips with Google Cloud AI and machine learning capabilities," https://cloud.google.com/customers/asml, Nov. 12, 2019.
(Continued)

*Primary Examiner* — Christopher E. Everett
(74) *Attorney, Agent, or Firm* — Huse IP Law; Charles C. Huse (57) ABSTRACT

In some embodiments, a method is performed at a computer system of a manufacturer. The manufacturer operates a manufacturing facility that includes equipment from an equipment supplier. In the method, a request is received for electronic access by the equipment supplier to the manufacturing facility to perform a remote support activity for the equipment. The request is routed to predefined approvers. Approval of the request is received from the predefined approvers. In response to receiving approval of the request from the predefined approvers, a connection is automatically created between an electronic device in the manufacturing facility and a computer system for the equipment supplier. The connection is used for the remote support activity. Upon completion of the remote support activity, the connection is automatically terminated.

20 Claims, 5 Drawing Sheets

(56) References Cited

U.S. PATENT DOCUMENTS

| | | |
|---|---|---|
| 8,533,854 B2 | 9/2013 | Ginter et al. |
| 8,983,644 B2 | 3/2015 | Cheng et al. |
| 9,516,003 B2 | 12/2016 | Menon |
| 9,584,509 B2 | 2/2017 | Hamburg et al. |
| 9,843,450 B2 | 12/2017 | Kravitz et al. |
| 10,091,169 B2 | 10/2018 | Cohen et al. |
| 10,127,562 B2 | 11/2018 | Price et al. |
| 10,356,095 B2 | 7/2019 | Meyer |
| 10,542,083 B2 | 1/2020 | Giffin et al. |
| 10,757,194 B2 | 8/2020 | Barry et al. |
| 2002/0013908 A1* | 1/2002 | Nishihata ............ G06F 21/6218 726/25 |
| 2003/0147369 A1* | 8/2003 | Singh .................. H04W 12/033 370/353 |
| 2005/0097440 A1 | 5/2005 | Lusk et al. |
| 2011/0213821 A1 | 9/2011 | Gentile et al. |
| 2012/0110330 A1 | 5/2012 | Dickgiesser et al. |
| 2014/0040397 A1* | 2/2014 | Bomgaars ............... H04L 41/50 709/217 |
| 2014/0104045 A1* | 4/2014 | Haberlein ............. G08C 19/00 340/12.22 |
| 2014/0236515 A1 | 8/2014 | Ho et al. |
| 2015/0074749 A1* | 3/2015 | Vasko ................ G05B 19/4185 726/1 |
| 2015/0319178 A1 | 11/2015 | Desai et al. |
| 2018/0027006 A1 | 1/2018 | Zimmermann et al. |
| 2019/0182106 A1* | 6/2019 | Gibson .................. H04L 41/08 |
| 2020/0134222 A1* | 4/2020 | Walker .................. G06F 21/602 |

OTHER PUBLICATIONS

Everythingrf, "Telit IoT Solutions Allow Remote Access to Equipment in Over 100 Semiconductor Fabs," Apr. 5, 2017, https://www.everythingrf.com/News/details/3905-Telit-IoT-Solutions-Allow-Remote-Access-to-Equipment-in-Over-100-Semiconductor-Fabs.

Microsoft, "Microsoft Teams," https://www.microsoft.com/en-us/microsoft-teams/group-chat-software (downloaded Jul. 13, 2021).

Microsoft, "What is SharePoint," https://support.microsoft.com/en-us/office/what-is-sharepoint-97b915e6-651b-43b2-827d-fb25777f446f (downloaded Jul. 13, 2021).

Min-Hsuing Hung et al., "A Secure Collaborative e-Diagnostics Framework for Semiconductor Factories," IEEE International Conference on Automation Science and Engineering, Sep. 2005.

Peer Group, "Remicus," https://www.peergroup.com/expertise/oems/remote-connectivity/remicus/ (downloaded Jul. 13, 2021).

Qnext, "Qnext Delivers FileFlex Enterprise for Secure Transfer of Files without Using the Cloud," Apr. 17, 2018, https://fileflex.com/blog/company/news/qnext-delivers-fileflex-enterprise-secure-transfer-files-without-using-cloud/.

PCT/US2022/015722, International Search Report, dated May 26, 2022.

PCT/US2022/015722, Written Opinion of the International Searching Authority, dated May 26, 2022.

* cited by examiner

SECURE REMOTE COLLABORATION FOR EQUIPMENT IN A MANUFACTURING FACILITY

RELATED APPLICATION

This application claims priority to U.S. Provisional Patent Application No. 63/153,970, filed on Feb. 26, 2021, which is incorporated by reference in its entirety for all purposes.

TECHNICAL FIELD

This disclosure relates to computer security for manufacturing facilities, and more specifically to maintaining computer security while allowing for remote collaboration with an equipment supplier.

BACKGROUND

Manufacturing facilities include equipment provided by equipment suppliers. A manufacturing facility may desire to collaborate with an expert at an equipment supplier to get the expert's help regarding a piece of equipment. It is desirable for this collaboration to be remote, so that the expert does not have to travel to the manufacturing facility. Remote collaboration, however, involves electronic access to the manufacturing facility that presents security risks. Computer security is a particularly sensitive issue for manufacturing facilities because they possess highly confidential information regarding products being manufactured and the fabrication processes used to manufacture the products. Computer security is also complex to implement, with controls for collaboration that are manual and differ for different types of collaboration, such as audioconferences, videoconferences, data transfer for troubleshooting, and data transfer for optimization.

SUMMARY

In some embodiments, a method is performed at a computer system of a manufacturer. The manufacturer operates a manufacturing facility that includes equipment from an equipment supplier. In the method, a request is received for electronic access by the equipment supplier to the manufacturing facility to perform a remote support activity for the equipment. The request is routed to predefined approvers. Approval of the request is received from the predefined approvers. In response to receiving approval of the request from the predefined approvers, a connection is automatically created between an electronic device in the manufacturing facility and a computer system for the equipment supplier. The connection is used for the remote support activity. Upon completion of the remote support activity, the connection is automatically terminated.

In some embodiments, a non-transitory computer-readable storage medium stores one or more programs for execution by one or more processors of a computer system of a manufacturer. The manufacturer operates a manufacturing facility that includes equipment from an equipment supplier. The one or more programs include instructions for performing the above method.

In some embodiments, a system includes equipment from an equipment supplier. The equipment is situated in a manufacturing facility operated by a manufacturer. The system also includes a computer system of the manufacturer with one or more processors and memory storing one or more programs for execution by the one or more processors. The one or more programs include instructions for instructions for performing the above method.

BRIEF DESCRIPTION OF THE DRAWINGS

For a better understanding of the various described embodiments, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1A:
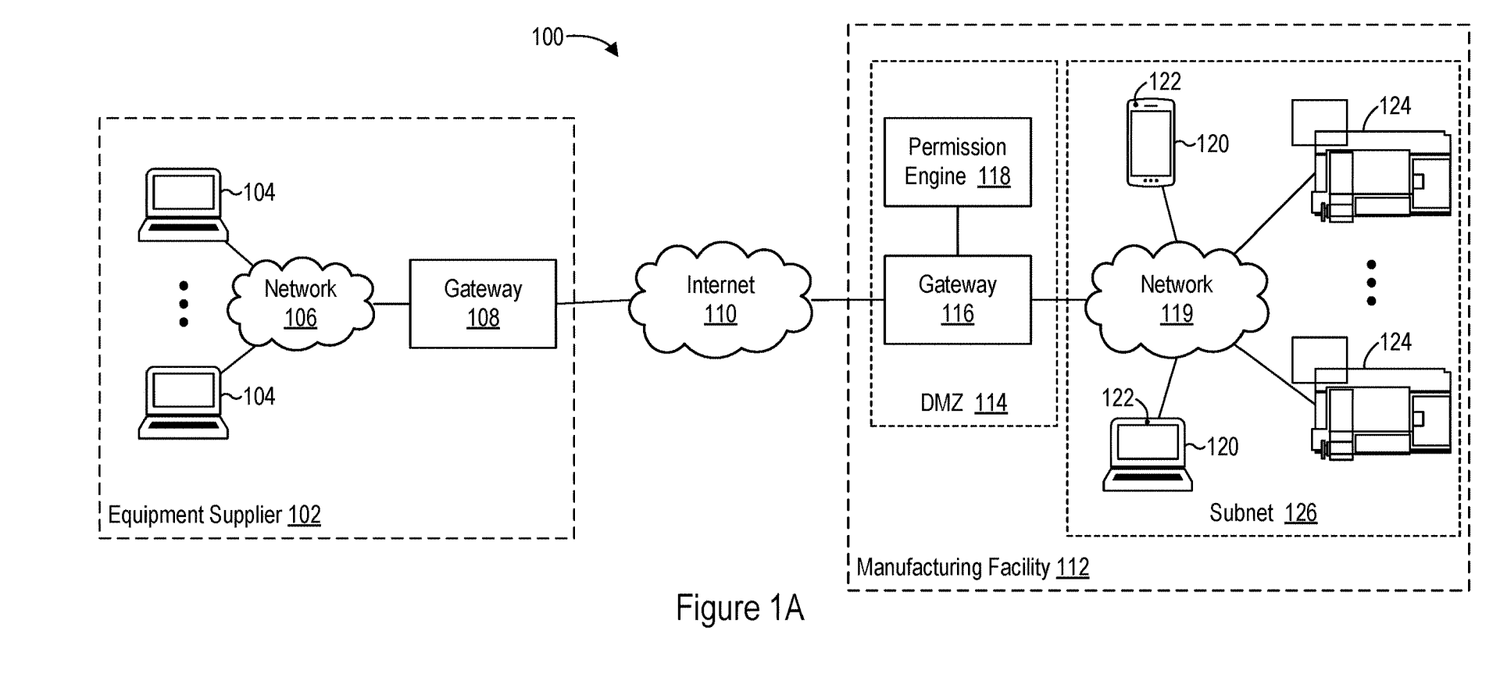
FIG. 1A shows a network architecture for electronic communication between a manufacturing facility and an equipment supplier, in accordance with some embodiments.

FIG. 1A shows a network architecture 100 for electronic communication between a manufacturing facility 112 and an equipment supplier 102, in accordance with some embodiments. The manufacturing facility 112 includes equipment 124 used for manufacturing (i.e., manufacturing equipment, also referred to as capital equipment). In some embodiments, the manufacturing facility 112 is a semiconductor fabrication facility (i.e., a "semiconductor fab" or simply a "fab") and the equipment 124 includes semiconductor fabrication equipment and semiconductor inspection equipment. In other embodiments, the manufacturing facility 112 is another type of factory with other equipment 124. The manufacturing facility 112 may include multiple pieces of equipment 124. Respective pieces of equipment 124 may be referred to as manufacturing tools or simply tools. In the example of a semiconductor fab, a respective piece of equipment 124 may be a fabrication tool or an inspection tool. The equipment supplier 102 supplies (e.g., designs, manufactures, sells, and/or supports) pieces of the equipment 124 (i.e., respective manufacturing tools).

The equipment 124 in the manufacturing facility 112 is situated behind a gateway 116 that provides computer security for the manufacturing facility 112. The gateway 116 runs on a computer system of the manufacturing facility 112 (e.g., on the computer system 400, FIG. 4). The equipment 124 is communicatively coupled with the gateway 116 through a network 119 that is internal to the manufacturing facility 112. For example, respective pieces of equipment 124 include respective electronic devices (e.g., computerized control systems) that control operation of the respective pieces of equipment 124. These respective electronic devices are communicatively coupled with the gateway 116 through the network 119. The manufacturing facility 112 also includes other electronic devices 120 (e.g., computers, mobile electronic devices, etc.) that are communicatively coupled with the gateway 116 through the network 119. The equipment 124 and electronic devices 120, as networked through the network 119, compose a subnet 126 that is internal to the manufacturing facility 112.

The manufacturing facility 112 may desire to remotely collaborate with the equipment supplier 102. For example, an engineer or operator at the manufacturing facility 112 may seek the help of an expert at the equipment supplier 102 regarding the installation, operation, servicing, and/or repair of one or more pieces of equipment 124 provided by the equipment supplier 102. The manufacturing facility 112 seeks to maintain security while allowing this remote collaboration, to protect secrets (e.g., intellectual property) held by the manufacturing facility 112. Such secrets include, for example, information about the design of products manufactured in the manufacturing facility 112 and information about the fabrication process used to manufacture the products. The equipment supplier 102 seeks to maintain security while providing equipment support, to protect secrets (e.g., intellectual property) held by the equipment supplier 102. Such secrets include, for example, information about the design of the equipment 124 provided by the equipment supplier 102 and proprietary service procedures for the equipment 124 provided by the equipment supplier 102.

The gateway 116, in conjunction with a permission engine 118, processes requests to allow a computer system 104 at the equipment supplier 102 to access a piece of equipment 124 (e.g., an electronic device integrated in the piece of equipment 124 that controls operation of the piece of equipment 124) and/or an electronic device 120 at the manufacturing facility 112. For example, the electronic device 120 may include a camera 122 that the expert at the computer system 104 seeks to access to videoconference with someone at the manufacturing facility 112 and/or to view a piece of equipment 124. In some embodiments, an electronic device 120 may be a camera headset capable of providing live streaming for remotely viewing equipment 124. The computer system 104 may be situated behind a gateway 108 at the equipment supplier 102. For example, the computer system 104 is one of a plurality of computer systems 104 at the equipment supplier 102 that are communicatively coupled to the gateway 108 through a network 106 that is internal to the equipment supplier 102. The gateway 108 communicates electronically with the gateway 116 through the Internet 110.

The permission engine 118 runs on a computer system of the manufacturing facility 112 (e.g., on the same computer system as the gateway 116, or on a separate computer system that is networked with the computer system for the gateway 116). The permission engine 118 and gateway 116 are disposed in a computer-security region called a demilitarized zone (DMZ) 114, so-called because it is isolated from other networks (e.g., from the Internet 110 and from the network 119 and corresponding subnet 126) and can be accessed only with specific permission (e.g., as provided by the manufacturing facility 112). The gateway 116 and permission engine 118 may provide a stateless workflow engine that processes access requests. If the permission engine 118 determines that a request for access to a piece of equipment 124 (or to an electronic device 120) is authorized, then the gateway 116 automatically creates a connection 128 (FIG. 1B) between the corresponding computer system 104 of the equipment supplier 102 and the piece of equipment 124 (or the electronic device 120). The connection 128 may include a tunnel between the computer system 104 and the piece of equipment 124 (or the electronic device 120). For example, the gateway 116 automatically creates a virtual private network (VPN) for the computer system 104 and the piece of equipment 124 (or the electronic device 120). In some embodiments, the VPN includes multiple computer systems 104 of the equipment supplier, multiple pieces of equipment 124, and/or multiple electronic device 120. The connection 128 may be encrypted using encryption keys controlled by the manufacturing facility 112 (i.e., controlled by the manufacturer that runs the manufacturing facility 112).

Access requests are made to allow the equipment supplier 102 to perform remote support activities. These remote support activities are examples of remote collaboration between the equipment supplier 102 and the manufacturing facility 112. Examples of access requests include, without limitation, requests to remotely control a piece of equipment 124 (i.e., a manufacturing tool), requests to assist with a piece of equipment 124 (i.e., a manufacturing tool), requests to download data from the manufacturing facility 112 to the equipment supplier 102 (e.g., to a computer system 104), and requests to upload data from the equipment supplier 102 (e.g., from a computer system 104) to the manufacturing facility 112 (e.g., to a manufacturing tool or to an electronic device 120). A request to assist with a manufacturing tool may include a request to conduct a videoconference or audioconference regarding the manufacturing tool and/or to view the manufacturing tool using a camera 122 on an electronic device. For requests to upload and download data, the data to be uploaded or downloaded may be associated with a particular manufacturing tool or type of manufacturing tool. Examples of data to be uploaded or downloaded include, without limitation, one or more data files, one or more data streams, and/or data for accessing a software application relating to a piece of equipment 124. A remote support activity thus may involve accessing an application relating to a piece of equipment 124. The destination of the data, who has access to the data, and how long the data persists are all controlled by the manufacturing facility 112, in accordance with some embodiments.

In some embodiments, a set of approvers for requests is predefined, such that the approvers for a request are defined before the request is made (e.g., before the gateway 116 receives the request). For example, the set of approvers for a request may have been previously defined as the approvers for all requests of a particular kind (e.g., for all requests involving a particular type of equipment 124, or for all requests to control a particular type of equipment 124, to assist with a particular type of equipment 124, to upload data for a particular type of equipment 124, or to download data for a particular type of equipment 124), wherein the request is a request of the particular kind. The approvers include one or more approvers (e.g., employees and/or consultants) at the manufacturing facility 112. For example, the approvers include a manufacturing-tool operator, a manufacturing-tool engineer, a manager of the manufacturing facility 112, and/or an administrator (e.g., IT administrator) of the manufacturing facility 112. The manufacturing-tool engineer may be the engineer at the manufacturing facility 112 who is responsible for, and thus "owns," the manufacturing tool (i.e., the piece of equipment 124); this engineer is referred to as the tool owner. The approvers may also include one or more approvers (e.g., employees and/or consultants) at the equipment supplier 102. For example, the approvers may include an engineer of the equipment supplier 102 (e.g., an engineer who is an expert regarding the manufacturing tool) and/or an administrator (e.g., IT administrator) of the equipment supplier 102.

Figure 1B:
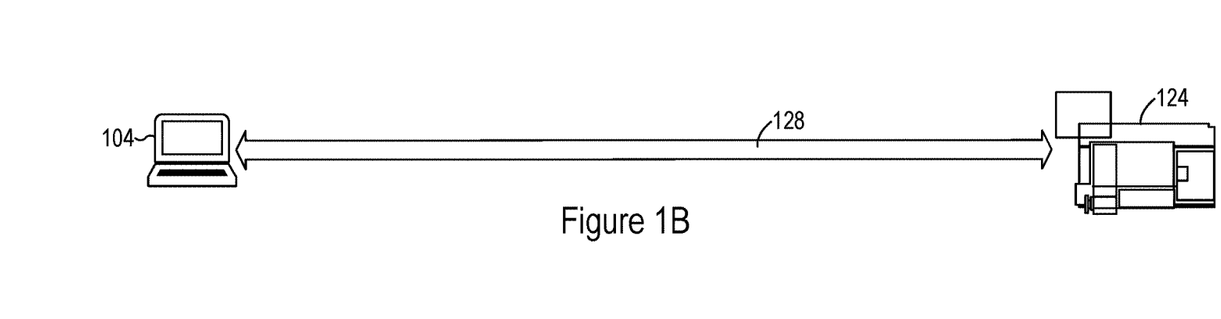
FIG. 1B shows a connection between a computer system of the equipment supplier of FIG. 1A and a piece of equipment of the manufacturing facility of FIG. 1A, in accordance with some embodiments.
Figure 2:
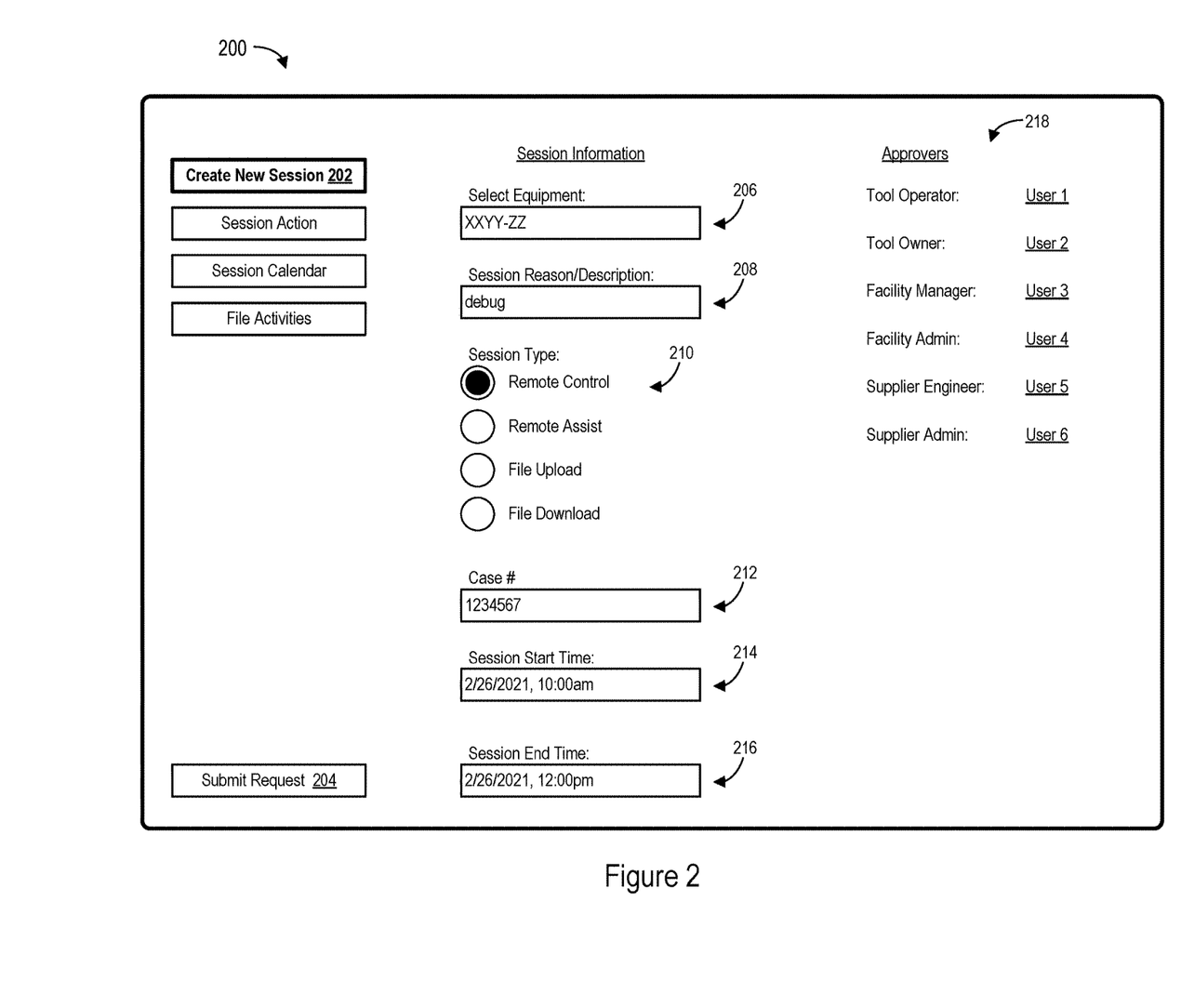
FIG. 2 shows a graphical user interface for requesting collaboration with a piece of equipment in a manufacturing facility, in accordance with some embodiments.

FIG. 2 shows a graphical user interface (GUI) 200 for requesting collaboration with a piece of equipment 124 (e.g., to control, assist with, or upload or download data for the piece of equipment 124), in accordance with some embodiments. A similar GUI may be used to request collaboration with an electronic device 120 (FIG. 1A). The GUI 200 may be shown in response to selection of a "create new session" affordance 202 (e.g., a button or other icon). In the GUI 200, a "session" refers to a period of allowed access. The user provides various inputs in the GUI 200, including input 206 specifying the equipment 124, input 208 describing the purpose of the session, input 210 specifying the type of request (and thus the type of session), input 212 specifying a case number for the request (alternatively, the case number is auto-populated by the gateway 116), input 214 specifying the starting date and time for the session, and input 216 specifying the ending date and time for the session. The GUI 200 lists the predefined approvers 218 for the request. The user submits the request by selecting a "submit request" affordance 204 (e.g., a button or other icon). If the predefined approvers 218 all approve the request, then the permission engine 118 will signal the gateway 116 that the request is approved, and the gateway 116 will automatically create a connection 128 at the specified starting date and time to allow the requested access. The gateway 116 will subsequently automatically terminate the connection 128 at the specified ending date and time. The connection 128 is thus dynamically created and terminated, thereby avoiding manually opening and closing ports, which is error-prone.

Figure 3:
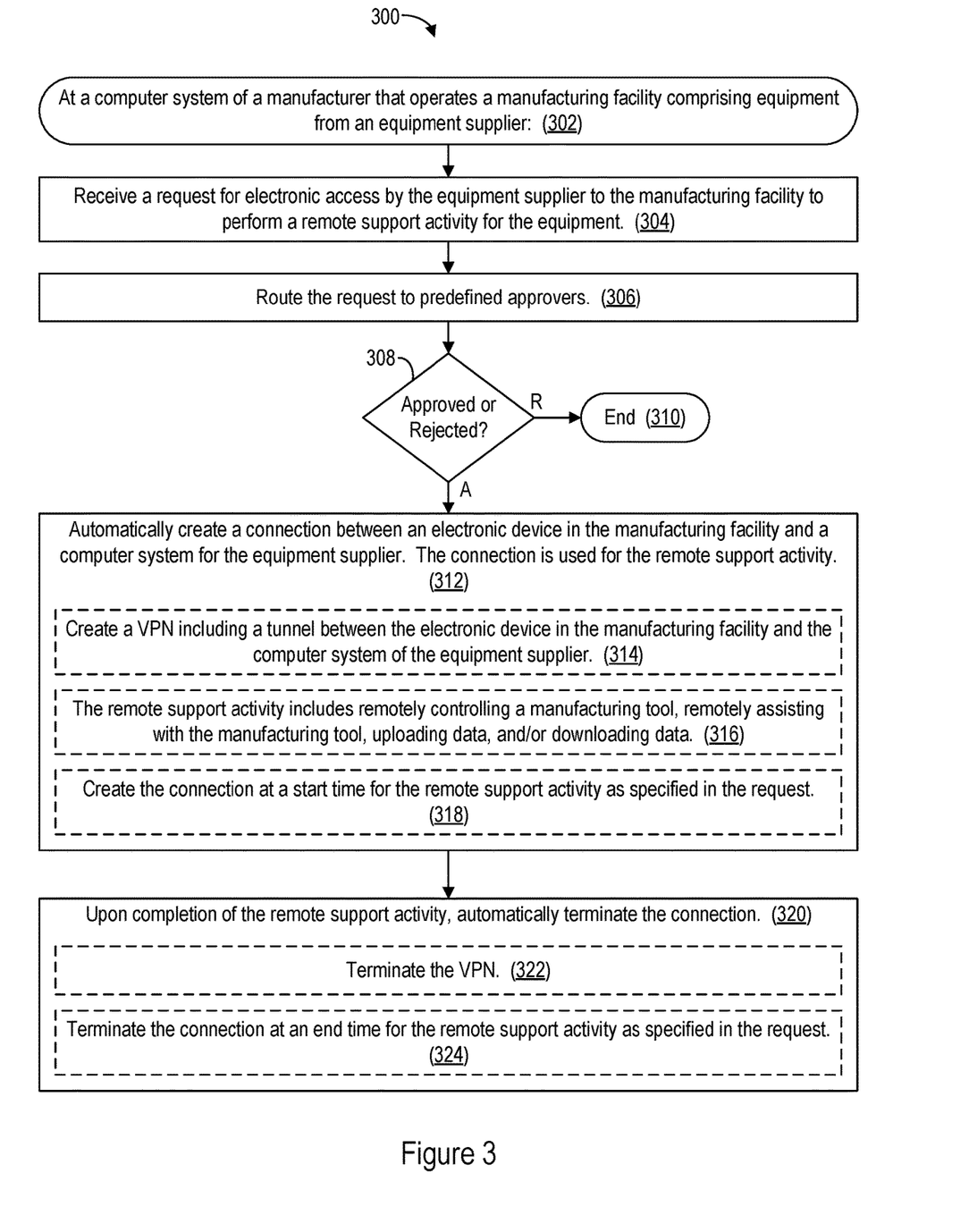
FIG. 3 is a flowchart showing a method for allowing secure remote collaboration regarding equipment in a manufacturing facility, in accordance with some embodiments.

FIG. 3 is a flowchart showing a method 300 for allowing secure remote collaboration regarding equipment 124 in a manufacturing facility 112, in accordance with some embodiments. The method 300 is performed (302) at a computer system of a manufacturer that operates a manufacturing facility 112 that has equipment 124 from an equipment supplier 102. For example, the method 300 is performed at a computer system (e.g., computer system 400, FIG. 4) that implements the gateway 116 and permission engine 118 (FIG. 1A). The equipment 124 may include a manufacturing tool connected to the computer system of the manufacturer through a network 119 at the manufacturing facility 112.

In the method 300, a request is received (304) for electronic access by the equipment supplier 102 to the manufacturing facility to perform a remote support activity for the equipment. The request may come from the equipment supplier 102 (e.g., from a computer system 104 or from an application running on the gateway 108, FIG. 1A). Alternatively, the request may come from within the manufacturing facility 112 (e.g., from an owner or operator of the manufacturing tool who desires to collaborate with the equipment supplier 102). The request may specify a piece of equipment 124 and/or an electronic device 120 (FIG. 1A) to which the equipment supplier 102 is to be given access.

The request is routed (306) to predefined approvers (e.g., approvers 218, FIG. 2) for approval. For example, respective emails or messages are sent to the predefined approvers asking them if they approve the request. If any of the predefined approvers rejects the request (308-R), then the requested remote support activity will not be performed and the method 300 ends (310).

If the predefined approvers all approve the request (308-A), a connection (e.g., connection 128, FIG. 1B) is automatically created (312) between an electronic device in the manufacturing facility 112 (e.g., as specified in the request) and a computer system 104 for the equipment supplier 102. The connection is thus created in response to receiving approval of the request from the predefined approvers. For security, no full-time connection exists and no connection is exposed to the Internet 110. The connection is used for the remote support activity. Creating the connection may include creating (314) a VPN that includes a tunnel between the electronic device in the manufacturing facility 112 and the computer system 104 of the equipment supplier 102. The remote support activity may include (316) remotely controlling the manufacturing tool, remotely assisting with the manufacturing tool, uploading data, and/or downloading data.

For example, the equipment 124 includes a manufacturing tool connected to the computer system of the manufacturer (e.g., to the gateway 116) through a network 119 at the manufacturing facility 112, the electronic device controls the manufacturing tool (e.g., is integrated in the manufacturing tool), and the remote support activity includes remotely controlling the manufacturing tool. The VPN connects the manufacturing tool (i.e., the electronic device in the manufacturing tool) to the computer system 104 of the equipment supplier 102.

In another example, the equipment 124 includes a manufacturing tool connected to the computer system of the manufacturer (e.g., to the gateway 116) through the network 119, the remote support activity includes remotely assisting with the manufacturing tool, and the electronic device (e.g., an electronic device 120, FIG. 1A) in the manufacturing facility 112 includes a camera 122 (FIG. 1A). The camera 122 may be used during the remote support activity to allow the equipment supplier 102 (e.g., an expert at the equipment supplier 102) to videoconference with the manufacturing facility 112 regarding the manufacturing tool and/or to view the manufacturing tool. The method 300 may further include verifying that views provided by the camera 122 during the remote support activity are allowed views. A determination that a view provided by the camera 122 is not an allowed view may cause an alarm to be raised and/or remote access to the camera 122 to be terminated (e.g., temporarily terminated, until the view is again an allowed view).

In some embodiments, the connection is created (318) at a start time for the remote support activity as specified in the request (e.g., as specified by the user input 214, FIG. 2).

Upon completion of the remote support activity, the connection is automatically terminated (320). For example, the VPN is terminated (322). In some embodiments, the connection is terminated (324) at an end time for the remote support activity as specified in the request (e.g., as specified by the user input 216, FIG. 2).

The computer systems of the manufacturer (e.g., the gateway 116, FIG. 1A) and/or the equipment supplier 102 (e.g., the gateway 108, FIG. 1A) may automatically monitor the remote support activity to detect potential security breaches. Data transmitted over the connection may be scanned for viruses. Also, any changes to normal routine (e.g., any unusual activity) may indicate a potential security breach. Detection of a potential security breach may result in an alarm being raised and/or termination of the connection. For example, the computer system may verify whether a size of data (e.g., of a file) being uploaded or downloaded matches an expected size (e.g., an historical size) of the data (e.g., of the file). A difference (e.g., that satisfies a threshold) between the data size and the expected size indicates a potential security breach. In another example, the computer system may verify whether a template (e.g., a pattern or format) for data being uploaded or downloaded matches an expected template for the data. A difference between the template and the expected template indicates a potential security breach.

Other examples of monitoring remote support activity to detect potential security breaches include, without limitation, checking for terminal activity that accesses different screens than normal (e.g., screens than have not been previously accessed for the type of remote support activity in question) or accesses specific screens that have been marked off limits, checking for users (e.g., videoconference or audioconference attendees) that were not authorized, and checking for attendance from unusual (e.g., previously unused) or unauthorized locations (e.g., IP addresses). Checking for unauthorized users may include performing facial recognition to verify the attendees of a videoconference. Still other examples include monitoring views provided by a camera 122 (FIG. 1A) (e.g., based on the images themselves and/or gyroscopic and/or position data of an electronic device 120 that includes the camera 122). The computer system may have been taught the location, angles, and/or images of allowed views and may use this teaching to monitor the views provided by the camera 122 and determine when the provided views are not allowed views. Yet other examples include detecting whether a viewer (e.g., a user at the equipment supplier 102) has captured a screen image during the remote support activity. Detecting whether a viewer has captured a screen image may include recognizing whether the viewer is holding a camera in front of the screen to inappropriately record images and/or detecting whether the viewer has saved a screenshot. Suitably trained artificial intelligence may be used to perform some or all of this monitoring, in accordance with some embodiments.

In some embodiments, the method 300 is performed by a first application running on the computer system of the manufacturer. The first application is configured to communicate with a second application running on the computer system (e.g., gateway 108, FIG. 1A) of the equipment supplier 102. In step 304, the request may be received from the second application. The connection may include a connection between the first application and the second application.

In some embodiments, the computer system of the manufacturer (i.e., the computer system of step 302, FIG. 3) (e.g., the gateway 116) logs information regarding the request, the connection, and/or the remote support activity of the method 300. Logged information regarding the request may include the information shown in the GUI 200 (FIG. 2). Other logged information may include, without limitation, IP addresses used for the remote support activity, names of users involved in the remote support activity, electronic devices 120 used for the remote support activity, and results of the remote support activity. The logged information provides an audit trail that may be used to verify the propriety of the remote support activity, identify security risks, and establish trust between the manufacturing facility 112 and the equipment supplier 102. The computer system generates reports specifying at least a portion of the logged information. For example, the computer system may generate such reports periodically (e.g., monthly, quarterly, etc.). Reports may be provided (e.g., sent or made available via a GUI) to the predefined providers and/or other users.

In some embodiments, the computer system of the equipment supplier 102 (e.g., the gateway 108) may similarly log information regarding the request, the connection, and/or the remote support activity of the method 300 and generate reports.

The method 300 and the computer system(s) that implement it may provide connections for multiple types of collaboration with an equipment supplier 102 with common security and authorization control, thereby facilitating management of security by the manufacturer. The manufacturer may readily allow collaborations with the assurance of security and control for those collaborations.

Figure 4:
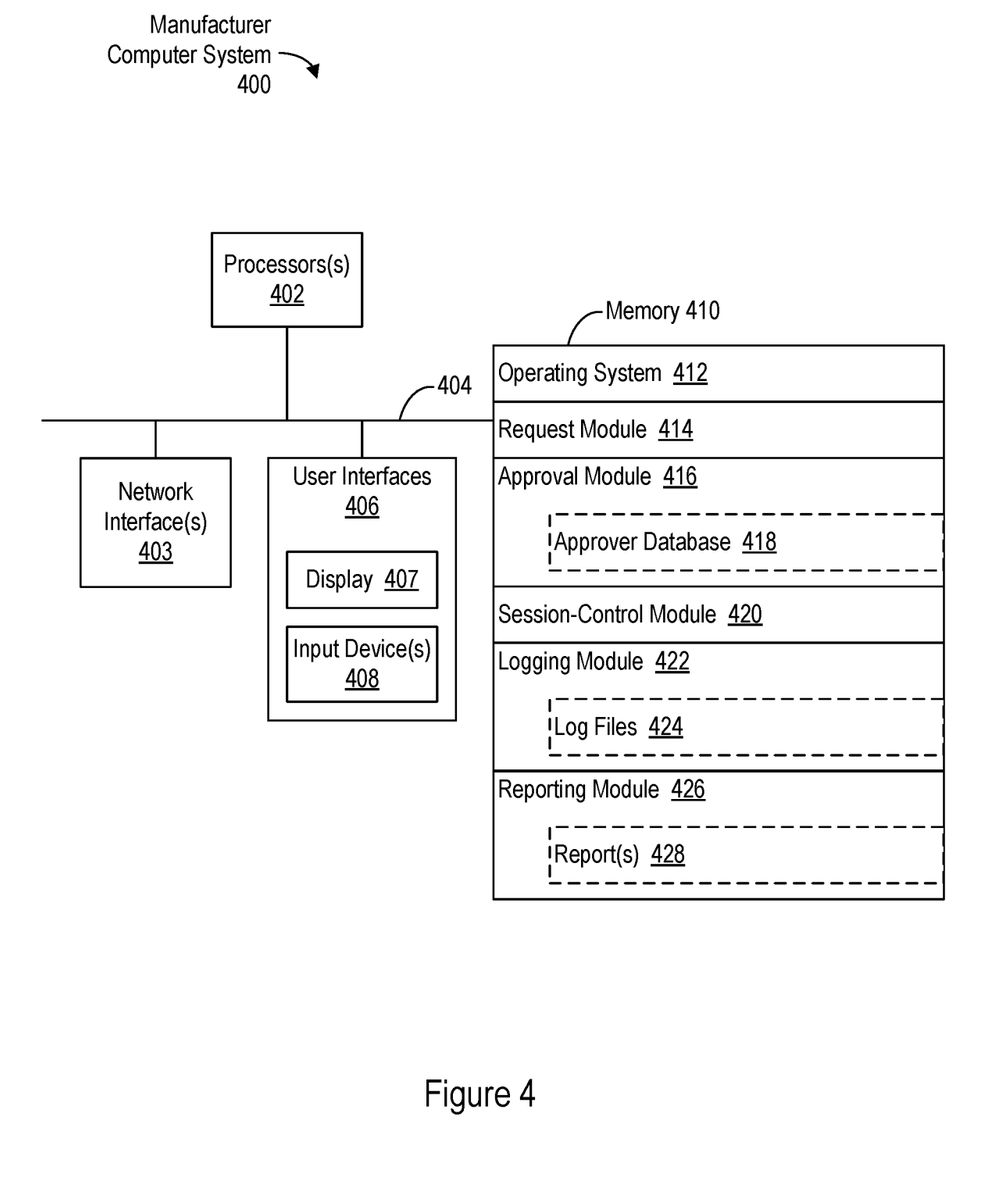
FIG. 4 is a block diagram of a computer system of a manufacturing facility in accordance with some embodiments.

FIG. 4 is a block diagram of a computer system 400 of the manufacturer, and thus of the manufacturing facility 112, in accordance with some embodiments. The computer system 400 includes one or more processors 402 (e.g., CPUs), user interfaces 406, memory 410, and communication bus(es) 404 interconnecting these components. The computer system 400 also includes one or more network interfaces 403 for communicating via the Internet 110 and/or the network 119 (FIG. 1A). The computer system 400 may be disposed in the DMZ 114 (FIG. 1A).

The user interfaces 406 may include a display 407 and one or more input devices 408 (e.g., a keyboard, mouse, touch-sensitive surface of the display 407, etc.). The display 407 may display graphical user interfaces (e.g., GUI 200, FIG. 2) regarding remote support activities and corresponding requests and connections. The display 407 may display reports generated based on logging performed by the computer system 400.

Memory 410 includes volatile and/or non-volatile memory. Memory 410 (e.g., the non-volatile memory within memory 410) includes a non-transitory computer-readable storage medium. Memory 410 optionally includes one or more storage devices remotely located from the processors 402 and/or a non-transitory computer-readable storage medium that is removably inserted into the computer system 400. The memory 410 (e.g., the non-transitory computer-readable storage medium of the memory 410) includes instructions for performing all or a portion of the method 300 (FIG. 3).

In some embodiments, memory 410 (e.g., the non-transitory computer-readable storage medium of memory 410) stores the following modules and data, or a subset or superset thereof: an operating system 412 that includes procedures for handling various basic system services and for performing hardware-dependent tasks; a request module 414 for generating and processing access requests for remote support activities (e.g., the request of step 304 of the method 300, FIG. 3); an approval module 416 for routing access requests to predefined approvers and tracking the responses of the approvers (e.g., per steps 306 and 308 of the method 300, FIG. 3); a session-control module 420 for automatically creating and terminating connections (e.g., per steps 312 and 320 of the method 300, FIG. 3); a logging module 422 for logging information regarding access requests, connections, and/or remote support activity; and a reporting module 426 for generating reports containing all or a portion of the logged information. The request module 414 may provide the GUI 200 (FIG. 2). The approval module 416 may include an approver database 418 storing a list of the predefined approvers (e.g., approvers 218, FIG. 2). The approval module 416 may send access requests directly to approvers at the manufacturing facility 112. The approval module 416 may also send access requests directly to approvers at the equipment supplier 102, or may send access requests to the gateway 108 (e.g., to an application running on the gateway 108), which provides the access requests to the approvers at the equipment supplier 102. The logging module 422 may store log files 424 with the information logged by the logging module 422. The reporting module 426 may store one or more reports 428 generated by the reporting module 426. The request module 414, session-control module 420, logging module 422, and/or reporting module 426 may implement the functionality of the gateway 116 (FIG. 1A). The approval module 416 may implement the functionality of the permission engine 118 (FIG. 1A).

Each of the modules stored in the memory 410 corresponds to a set of instructions for performing one or more functions described herein. Separate modules need not be implemented as separate software programs. The modules and various subsets of the modules may be combined or otherwise re-arranged. In some embodiments, the memory 410 stores a subset or superset of the modules and/or data structures identified above.

FIG. 4 is intended more as a functional description of various features that may be present in a computer system of the manufacturing facility 112 than as a structural schematic. For example, the functionality of the computer system 400 may be split between multiple devices. A portion of the modules stored in the memory 410 may alternatively be stored in one or more other computer systems communicatively coupled with the computer system 400 through one or more networks.

Figure 5:
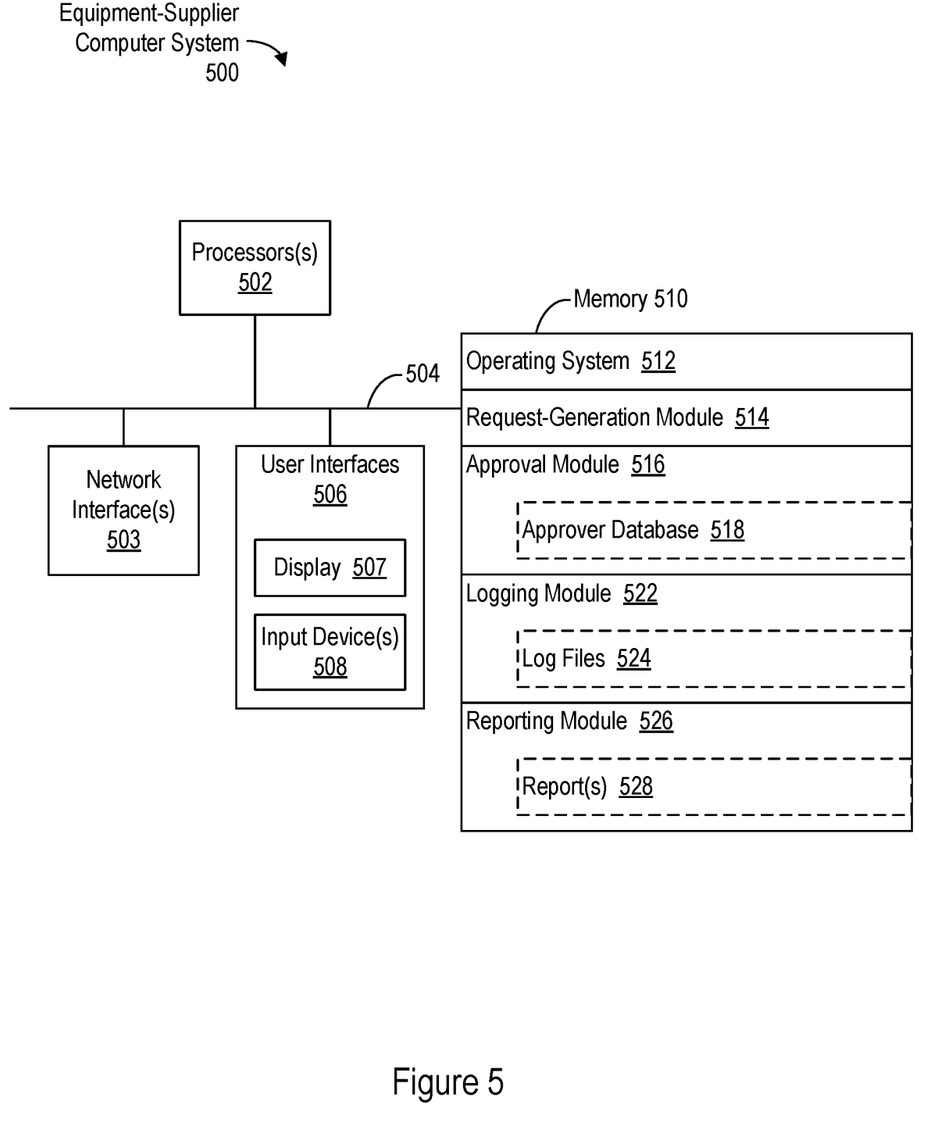
FIG. 5 is a block diagram of a computer system of an equipment supplier in accordance with some embodiments.

FIG. 5 is a block diagram of a computer system 500 of the equipment supplier 102, in accordance with some embodiments. The computer system 500 includes one or more processors 502 (e.g., CPUs), user interfaces 506, memory 510, and communication bus(es) 504 interconnecting these components. The computer system 500 also includes one or more network interfaces 503 for communicating via the Internet 110 and/or the network 106 (FIG. 1A).

The user interfaces 506 may include a display 507 and one or more input devices 508 (e.g., a keyboard, mouse, touch-sensitive surface of the display 507, etc.). The display 507 may display graphical user interfaces (e.g., GUI 200, FIG. 2) regarding remote support activities and corresponding connections. The display 507 may display reports generated based on logging performed by the computer system 500 and/or the computer system 400.

Memory 510 includes volatile and/or non-volatile memory. Memory 510 (e.g., the non-volatile memory within memory 510) includes a non-transitory computer-readable storage medium. Memory 510 optionally includes one or more storage devices remotely located from the processors 502 and/or a non-transitory computer-readable storage medium that is removably inserted into the computer system 500. In some embodiments, memory 510 (e.g., the non-transitory computer-readable storage medium of memory 510) stores the following modules and data, or a subset or superset thereof: an operating system 512 that includes procedures for handling various basic system services and for performing hardware-dependent tasks; a request-generation module 514 for generating access requests for remote support activities and sending the requests to the approval module 416 of the manufacturer computer system 400; an approval module 516 for sending approval requests to predefined approvers at the equipment supplier 102 and sending results of those requests to the approval module 416 of the manufacturer computer system 400; a logging module for logging information regarding access requests, connections, and/or remote support activity; and a reporting module 526 for generating reports containing all or a portion of the logged information. The request-generation module 514 may provide the GUI 200 (FIG. 2). The approval module 516 may include an approver database 518 storing a list of predefined approvers at the equipment supplier 102. The logging module 522 may store log files 524 with the information logged by the logging module 522. The reporting module 526 may store one or more reports 528 generated by the reporting module 526.

Each of the modules stored in the memory 510 corresponds to a set of instructions for performing one or more functions described herein. Separate modules need not be implemented as separate software programs. The modules and various subsets of the modules may be combined or otherwise re-arranged. In some embodiments, the memory 510 stores a subset or superset of the modules and/or data structures identified above.

FIG. 5 is intended more as a functional description of various features that may be present in a computer system of the equipment supplier 102 than as a structural schematic. For example, the functionality of the computer system 500 may be split between multiple devices. A portion of the modules stored in the memory 510 may alternatively be stored in one or more other computer systems communicatively coupled with the computer system 500 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising,
at one or more computer systems of a manufacturer, wherein the manufacturer operates a manufacturing facility comprising equipment from an equipment supplier:
receiving a request for electronic access by the equipment supplier to the manufacturing facility to perform a remote support activity for the equipment;
routing the request to a plurality of predefined approvers comprising one or more approvers at the manufacturer and one or more approvers at the equipment supplier;
receiving approval of the request from the plurality of predefined approvers;
in response to receiving approval of the request from the plurality of predefined approvers, automatically creating a connection between an electronic device in the manufacturing facility and a computer system for the equipment supplier, wherein the connection is used for the remote support activity; and
upon completion of the remote support activity, automatically terminating the connection.

2. The method of claim 1, wherein:
automatically creating the connection comprises creating a virtual private network comprising a tunnel between the electronic device in the manufacturing facility and the computer system of the equipment supplier; and
automatically terminating the connection comprises terminating the virtual private network.

3. The method of claim 2, wherein the virtual private network uses encryption keys controlled by the manufacturer.

4. The method of claim 2, wherein:
the equipment comprises a manufacturing tool connected to the computer system of the manufacturer through a network at the manufacturing facility;
the electronic device controls the manufacturing tool;
the remote support activity comprises remotely controlling the manufacturing tool; and
the virtual private network connects the manufacturing tool to the computer system of the equipment supplier.

5. The method of claim 2, wherein:
the equipment comprises a manufacturing tool connected to the computer system of the manufacturer through a network at the manufacturing facility;
the remote support activity comprises remotely assisting with the manufacturing tool; and
the electronic device in the manufacturing facility comprises a camera.

6. The method of claim 5, further comprising verifying that views provided by the camera during the remote support activity are allowed views.

7. The method of claim 1, wherein the remote support activity comprises uploading or downloading data relating to the equipment.

8. The method of claim 7, wherein the data is selected from the group consisting of a data file, a data stream, or data for accessing an application relating to the equipment.

9. The method of claim 7, further comprising verifying that a size of the data matches an expected size of the data.

10. The method of claim 7, further comprising verifying that a template for the data matches an expected template for the data.

11. The method of claim 7, further comprising specifying a destination of the data, who has access to the data, and how long the data will persist.

12. The method of claim 1, wherein:
the equipment comprises a manufacturing tool connected to the computer system of the manufacturer through a network at the manufacturing facility;
the one or more approvers at the manufacturer comprise an owner of the manufacturing tool and an operator of the manufacturing tool; and
the one or more approvers at the equipment supplier comprise an engineer for the manufacturing tool.

13. The method of claim 12, wherein the one or more approvers at the manufacturer further comprise a manager of the manufacturing facility.

14. The method of claim 1, wherein:
the equipment comprises a manufacturing tool connected to the computer system of the manufacturer through a network at the manufacturing facility; and
the plurality of predefined approvers comprises an approver selected from the group consisting of an owner of the manufacturing tool, an operator of the manufacturing tool, and a manager of the manufacturing facility.

15. The method of claim 1, wherein:
the request specifies a start time and an end time for the remote support activity;
the connection is automatically created at the start time; and
the connection is automatically terminated at the end time.

16. The method of claim 1, further comprising:
detecting that a user at the equipment supplier has captured a screen image during the remote support activity; and
in response to the detecting, raising an alarm.

17. The method of claim 1, further comprising, at the computer system of the manufacturer:
logging information regarding the request, the connection, and the remote support activity; and
generating a report specifying at least a portion of the logged information.

18. The method of claim 1, wherein:
receiving the request, routing the request, receiving approval of the request, automatically creating the connection, and automatically terminating the connection are performed by a first application running on the computer system of the manufacturer;
the first application is configured to communicate with a second application running on the computer system of the equipment supplier;
the request is received from the second application; and
the connection comprises a connection between the first application and the second application.

19. A non-transitory computer-readable storage medium storing one or more programs for execution by one or more processors of one or more computer systems of a manufacturer, wherein the manufacturer operates a manufacturing facility comprising equipment from an equipment supplier, the one or more programs including instructions for:
in response to receiving a request for electronic access by the equipment supplier to the manufacturing facility to perform a remote support activity for the equipment, routing the request to a plurality of predefined approvers comprising one or more approvers at the manufacturer and one or more approvers at the equipment supplier;
in response to receiving approval of the request from the plurality of predefined approvers, automatically creating a connection between an electronic device in the manufacturing facility and a computer system for the equipment supplier, wherein the connection is used for the remote support activity; and
upon completion of the remote support activity, automatically terminating the connection.

20. One or more computer systems of a manufacturer that operates a manufacturing facility, the one or more computer systems comprising:
one or more processors; and
memory storing one or more programs for execution by the one or more processors, the one or more programs comprising instructions for:
in response to receiving a request for electronic access by an equipment supplier to the manufacturing facility to perform a remote support activity for equipment in the manufacturing facility from the equipment supplier, routing the request to a plurality of predefined approvers comprising one or more approvers at the manufacturer and one or more approvers at the equipment supplier;
in response to receiving approval of the request from the plurality of predefined approvers, automatically creating a connection between an electronic device in the manufacturing facility and a computer system for the equipment supplier, wherein the connection is used for the remote support activity; and upon completion of the remote support activity, automatically terminating the connection.

\* \* \* \* \*